(12) United States Patent
Unno et al.

(10) Patent No.: US 10,399,643 B2
(45) Date of Patent: Sep. 3, 2019

(54) LIQUEFIED HYDROGEN LOADING ARM

(71) Applicants: KAWASAKI JUKOGYO KABUSHIKI KAISHA, Kobe-shi, Hyogo (JP); TOKYO BOEKI ENGINEERING LTD., Chuo-ku, Tokyo (JP)

(72) Inventors: Shuntaro Unno, Kobe (JP); Tomonori Takase, Kakogawa (JP); Tomoaki Umemura, Kobe (JP); Akihiko Inomata, Kobe (JP)

(73) Assignees: Kawasaki Jukogyo Kabushiki Kaisha, Kobe (JP); Tokyo Boeki Engineering Ltd., Tokyo (JP)

( * ) Notice: Subject to any disclaimer, the term of this patent is extended or adjusted under 35 U.S.C. 154(b) by 0 days.

(21) Appl. No.: 15/743,784

(22) PCT Filed: Jul. 12, 2016

(86) PCT No.: PCT/JP2016/003304
§ 371 (c)(1),
(2) Date: Jan. 11, 2018

(87) PCT Pub. No.: WO2017/010094
PCT Pub. Date: Jan. 19, 2017

(65) Prior Publication Data
US 2018/0208275 A1    Jul. 26, 2018

(30) Foreign Application Priority Data

Jul. 15, 2015 (JP) ................................. 2015-140972

(51) Int. Cl.
B63B 27/25    (2006.01)
B63B 27/34    (2006.01)
(Continued)

(52) U.S. Cl.
CPC .............. *B63B 27/25* (2013.01); *B63B 27/34* (2013.01); *B67D 9/00* (2013.01); *F16L 59/065* (2013.01);
(Continued)

(58) Field of Classification Search
CPC ..... B63B 27/25; B63B 27/34; B63B 2734/00; F16L 59/065; F17C 5/04; F17C 2221/012;
(Continued)

(56) References Cited

U.S. PATENT DOCUMENTS 2,922,446 A * 1/1960 Sheiry ...................... B67D 9/02
141/388
3,032,082 A * 5/1962 Vilain ...................... B67D 9/02
137/615
(Continued)

FOREIGN PATENT DOCUMENTS

| JP | 2006-168781 A | 6/2006 |
| JP | 2012-092962 A | 5/2012 |
| JP | 2012-163129 A | 8/2012 |
| WO | 2007/113203 A1 | 10/2007 |
| WO | 2014/122159 A1 | 8/2014 |

Primary Examiner — Craig M Schneider
Assistant Examiner — David R Deal
(74) Attorney, Agent, or Firm — Oliff PLC (57) ABSTRACT

A liquefied hydrogen loading arm configured to transport liquefied hydrogen includes: a support frame structure including a base riser erected on a ground, an inboard boom, an outboard boom, and a counterweight; a flexible vacuum insulation double tube including a flexible metal inner tube, a flexible metal outer tube fitted on the inner tube, and a vacuum layer, the vacuum insulation double tube being disposed in an upward curved shape in a space below the support frame structure; a vacuum insulation double connecting tube connected to a distal end portion of the vacuum insulation double tube and connected to a distal end portion of the outboard boom; and a midway portion support mechanism configured to support a lengthwise midway portion of (Continued)

the vacuum insulation double tube on the support frame structure through a hard curved member curved upward in a convex shape.

16 Claims, 4 Drawing Sheets

(51) Int. Cl.
*F16L 59/065* (2006.01)
*F17C 5/04* (2006.01)
*B67D 9/00* (2010.01)

(52) U.S. Cl.
CPC ............ *F17C 5/04* (2013.01); *B63B 2734/00* (2013.01); *F17C 2221/012* (2013.01); *F17C 2260/02* (2013.01); *F17C 2265/06* (2013.01); *F17C 2270/0105* (2013.01); *Y02E 60/321* (2013.01)

(58) Field of Classification Search
CPC . F17C 2260/02; F17C 2265/06; Y02E 60/321
USPC ............... 138/107; 248/123.11, 81, 325, 364
See application file for complete search history.

(56) References Cited

U.S. PATENT DOCUMENTS

| | | | | |
|---|---|---|---|---|
| 3,228,421 A * | 1/1966 | Sheiry | ............. | B67D 9/02 137/355.16 |
| 3,554,231 A * | 1/1971 | Caregnato | ............. | B67D 9/02 137/615 |
| 4,142,551 A * | 3/1979 | Wilms | ............. | B67D 9/02 137/615 |
| 4,411,290 A * | 10/1983 | Heath | ............. | B67D 7/002 137/615 |
| 5,150,866 A * | 9/1992 | Karpisek | ............. | B67D 7/002 248/79 |
| 5,836,361 A * | 11/1998 | Koncsek | ............. | B67D 7/38 141/279 |
| 6,883,548 B2 * | 4/2005 | Schippl | ............. | F16L 59/065 138/112 |
| 8,882,428 B2 * | 11/2014 | Fikes | ............. | B63B 27/25 137/615 |
| 9,004,102 B2 * | 4/2015 | Foo | ............. | B63B 27/34 137/615 |
| 2009/0165874 A1 * | 7/2009 | Pollack | ............. | B63B 27/24 137/615 |
| 2010/0147398 A1 * | 6/2010 | Thomas | ............. | B63B 27/24 137/315.01 |

* cited by examiner

LIQUEFIED HYDROGEN LOADING ARM

TECHNICAL FIELD

The present invention relates to a liquefied hydrogen loading arm.

BACKGROUND ART

Loading arms are usually used to load and unload fossil fuels such as crude oil, gasoline, light oil, and natural gases (LNG and LPG) between fossil fuel transport ships and storage tanks on the land. A general loading arm includes, as a support structure, an outer riser erected on the land, an inboard boom pivotally supported on the top portion of the outer riser, an outboard boom having an upper end portion pivotally connected to the upper end portion of the inboard boom, a counterweight mounted on the lower end side of the inboard boom, and the like.

The loading arm also includes, as a fossil fuel transport tube, an inner riser disposed in the outer riser, an inboard arm connected to the inner riser through a swivel joint and disposed on the inboard boom, an outboard arm that has an upper end portion connected to the upper end portion of the inboard arm through the swivel joint and is supported by the outboard boom, an emergency release system (ERS) connected to the lower end portion of the outboard arm through the swivel joint, and a joint portion connected to the ERS through or not through the swivel joint.

A loading arm is also used to transport fossil fuel between a storage tank on the land and a tank track.

Patent literature 1 discloses a loading arm that is used to transport LNG or the like between a tank track and a storage tank, and uses a single-tube flexible pipe. This loading arm includes a gantry, an inboard arm supported on the gantry, an outboard arm connected to the distal end portion of the inboard arm, a rotary joint connected to the lower end of the outboard arm, a track connecting arm supported by the rotary joint, and a flexible pipe for the transportation of LNG or the like, which is disposed in a space above the inboard arm and the outboard arm, has a top portion supported on a flexible base of a connecting portion between the inboard arm and the outboard arm, and has a distal end portion supported on the distal end portion of the track connecting arm.

CITATION LIST

Patent Literature

PTL 1: Japanese Laid-Open Patent Application No. 2006-168781

SUMMARY OF INVENTION

Technical Problem

Liquid hydrogen is a cryogenic fluid cooled to −253° C. In order to prevent the evaporation of this fluid and the generation of liquefied air, a vacuum insulation double tube with high thermal insulation performance needs to be used. A conventional LNG loading arm includes a plurality of swivel joints, and the above swivel joints cannot be applied to liquefied hydrogen. This makes it necessary to develop swivel joints for a vacuum insulation double tube having a special structure.

The flexible pipe of the loading arm disclosed in PTL 1 is a single tube, and hence cannot be used for loading liquefied hydrogen. The following problems arise when a flexible vacuum insulation double tube is adopted in place of the above flexible pipe.

The flexible pipe is disposed in a space on the upper side of the loading arm, and hence needs to have a long length. This increases the facility cost for the vacuum insulation double tube. In addition, since the top portion is supported only on a flexible base, it is difficult to ensure the stability of holding the shape and posture of the vacuum insulation double tube.

Since a vacuum insulation double tube is also larger in weight per unit length than a flexible pipe having a single tube structure, the top portion of the vacuum insulation double tube which is supported on the flexible base may be bent and damaged. Furthermore, there is no means for restraining the shaking movement of the vacuum insulation double tube which is caused by wind and the like, and hence the above technique lacks in practicality.

An object of the present invention is to provide a liquefied hydrogen loading arm configured to support a flexible vacuum insulation double tube for the transportation of liquefied hydrogen with a support frame structure including an inboard boom and an outboard boom.

Solution to Problem

A liquefied hydrogen loading arm according to an aspect of the present invention is a liquefied hydrogen loading arm configured to transport liquefied hydrogen. The loading arm includes a support frame structure including a base riser erected on a ground, an inboard boom having a lengthwise midway portion connected to an upper end portion of the base riser so as to be pivotal about a horizontal axis, an outboard boom pivotally connected to a distal end portion of the inboard boom, and a counterweight attached to a proximal end portion of the inboard boom, a flexible vacuum insulation double tube including a flexible metal inner tube, a flexible metal outer tube fitted on the inner tube, and a vacuum layer between the inner tube and the outer tube, the vacuum insulation double tube being disposed in an upward curved shape in a space below the support frame structure, a vacuum insulation double connecting tube connected to a distal end portion of the vacuum insulation double tube and connected to a distal end portion of the outboard boom, and a midway portion support mechanism configured to support a lengthwise midway portion of the vacuum insulation double tube on the support frame structure through a hard curved member curved upward in a convex shape.

According to the above arrangement, the use of the flexible vacuum insulation double tube for the transportation of liquefied hydrogen will eliminate the need to provide any swivel joints.

Since the vacuum insulation double tube is disposed in an upward curved shape in a space below the support frame structure, the length of the vacuum insulation double tube can be set to a minimum necessary length. This can achieve a reduction in facility cost.

Since the vacuum insulation double connecting tube connected to the distal end portion of the vacuum insulation double tube is connected to the distal end portion of the outboard boom, the vacuum insulation double connecting tube can be moved by the support frame structure while the distal end side portion of the vacuum insulation double tube is supported by the support frame structure.

Since the midway portion support mechanism is configured to support the lengthwise midway portion of the vacuum insulation double tube on the support frame structure through the upward curved member, the midway portion of the vacuum insulation double tube is curved in a shape conforming to the curved member without bending. This can prevent damage to the vacuum insulation double tube.

The midway portion support mechanism may include the curved member, a tensile rope connected to the curved member, a plurality of idling guide rings configured to support the tensile rope on the support frame structure, and a weight body for weight balancing connected to a proximal end portion of the tensile rope.

According to the above arrangement, since the midway portion support mechanism includes the curved member, the tensile rope, the plurality of idling guide rings, and the weight body for weight balancing, a midway portion support mechanism with a simple structure can be implemented, and most of the weight of the vacuum insulation double tube can be supported by the weight body for weight balancing through the tensile rope and the plurality of idling guide rings.

The liquefied hydrogen loading arm may be provided with a first guide member provided for the base riser and configured to guide the vacuum insulation double tube so as to inhibit the vacuum insulation double tube from pivoting outside a vertical plane including the support frame structure.

According to the above arrangement, providing the first guide member for the base riser makes it possible to guide the vacuum insulation double tube so as to inhibit it from pivoting outside a vertical plane including the support frame structure.

The liquefied hydrogen loading arm may include a second guide member connected to the outboard boom so as to make a proximal end portion pivotal about a horizontal axis within a vertical plane including the support frame structure and configured to guide the vacuum insulation double tube so as to inhibit the vacuum insulation double tube from pivoting outside the vertical plane, and a fluid pressure cylinder configured to drive the second guide member so as to pivot over a retract position and a guide position.

According to the above arrangement, connecting the second guide member to the outboard boom allows the second guide member to guide the vacuum insulation double tube so as to inhibit it from pivoting outside a vertical plane including the support frame structure. In addition, since the second guide member can be switched between the retract position and the guide position by the fluid pressure cylinder, the vacuum insulation double tube can be guided by switching the second guide member to the guide position as needed. When the second guide member is an obstacle, the second guide member can be switched to the retract position.

The liquefied hydrogen loading arm may include an extended member provided for the outboard boom so as to extend downward from a distal end of the outboard boom, and a mount base erected on a ground on which the extended member is mounted when the liquefied hydrogen loading arm is in an inactive state.

According to the above arrangement, the extended member extends downward from the distal end of the outboard boom. When the liquefied hydrogen loading arm is in the inactive state, the extended member can be mounted on the mount base and held at a predetermined position.

The liquefied hydrogen loading arm may include a first fluid pressure cylinder configured to drive the inboard boom so as to pivot and a second fluid pressure cylinder capable of changing an opening angle between the inboard boom and the outboard boom.

According to the above arrangement, the first fluid pressure cylinder can drive the inboard boom to pivot, and the second fluid pressure cylinder can change the opening angle between the inboard boom and the outboard boom. This makes it possible to move the distal end portion of the outboard boom to a desired position through the first and second fluid pressure cylinders.

Advantageous Effects of Invention

The present invention can provide a liquefied hydrogen loading arm configured to support a flexible vacuum insulation double tube for the transportation of liquefied hydrogen with a support frame structure including an inboard boom and an outboard boom.

DESCRIPTION OF EMBODIMENTS

Embodiments of the present invention will be described below.

Figure 1:
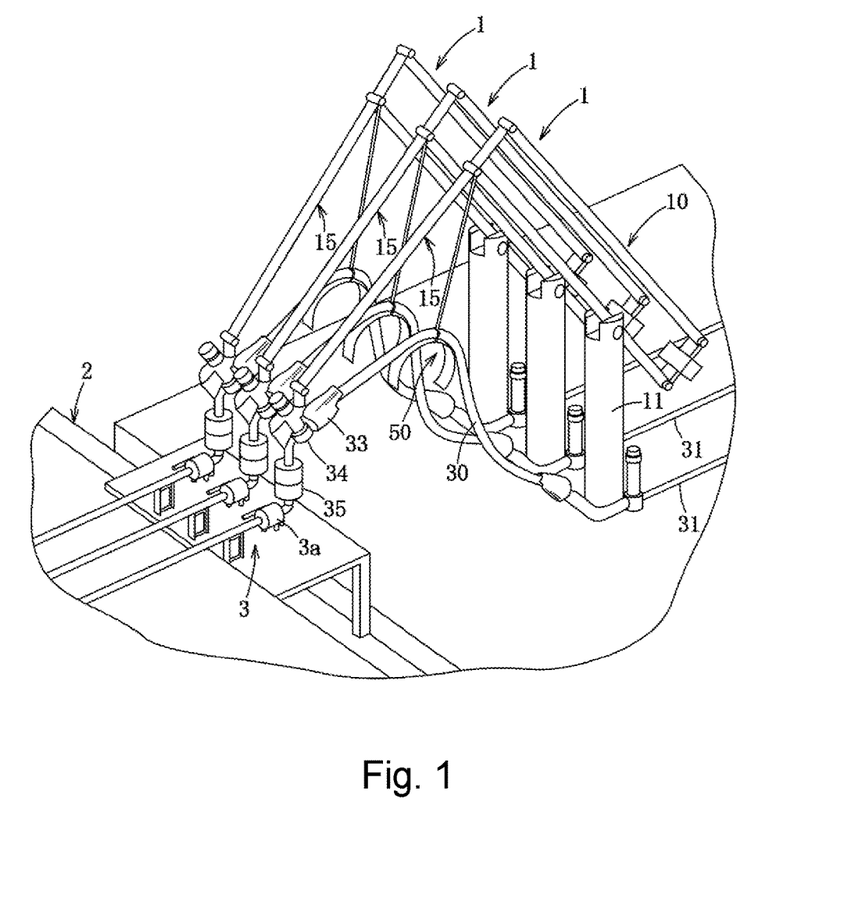
FIG. 1 is a schematic perspective view showing a liquefied hydrogen loading arm according to an embodiment which is connected to a manifold of a liquefied hydrogen transport ship.

As shown in FIG. 1, a liquefied hydrogen loading arm 1 (to be referred to as a loading arm hereinafter) capable of transporting liquefied hydrogen is installed on the land near the quay of a liquefied hydrogen storage base at which a liquefied hydrogen transport ship 2 is docked, and is used to unload liquefied hydrogen from the liquefied hydrogen transport ship 2 into the liquefied hydrogen storage tank or to load liquefied hydrogen from the liquefied hydrogen storage tank into the liquefied hydrogen transport ship 2.

Figure 2:
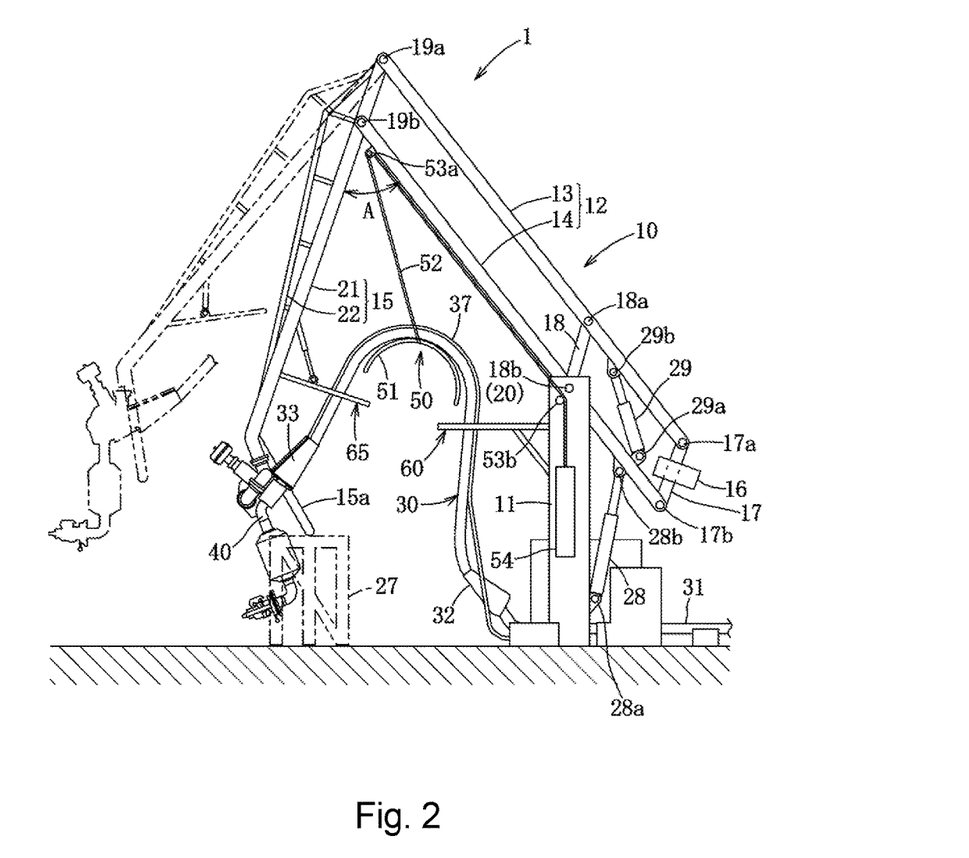
FIG. 2 is a side view of the loading arm.

As shown in FIGS. 1 and 2, the loading arm 1 includes a support frame structure 10, a flexible vacuum insulation double tube 30 supported by the support frame structure 10, a vacuum insulation double connecting tube 40 connected to the distal end portion of the vacuum insulation double tube 30, a midway portion support mechanism 50 that makes the support frame structure 10 support a lengthwise midway portion of the vacuum insulation double tube 30, and the like.

The support frame structure 10 includes a base riser 11 erected on the ground, an inboard boom 12 having a lengthwise midway portion connected to the upper end portion of the base riser 11 so as to be pivotable about a horizontal axis, an outboard boom 15 pivotally connected to the distal end portion of the inboard boom 12, and a counterweight 16 attached to the proximal end portion of the inboard boom 12.

The base riser 11 is a vertical columnar member, and has a connecting portion for connecting the inboard boom 12 on the upper end portion thereof. The inboard boom 12 includes two straight inclined frames 13 and 14 arranged parallel at an interval in the vertical direction, a proximal end connecting member 17 that connects the proximal end portions (lower end portions) of the inclined frames 13 and 14 through a pair of pin joint portions 17a and 17b having horizontal axes, and a midway connecting member 18 that connects the two inclined frames 13 and 14 with a pair of pin joint portions 18a and 18b having horizontal axes. The midway connecting member 18 is disposed near the proximal ends of the inclined frames 13 and 14. The distance from the pin joint portion 17a to the pin joint portion 17b is about ⅓ the distance from the pin joint portion 17a to a pin joint portion 19a.

The upper end portions of the two inclined frames 13 and 14 are connected to the outboard boom 15 with a pair of pin joint portions 19a and 19b having horizontal axes. The two inclined frames 13 and 14 constitute parallel links. The lower end portion of the midway connecting member 18 and a corresponding portion of the lower inclined frame 14 are hinged to the upper end portion of the base riser 11 through a pivot shaft 20 so as to be pivotal about the horizontal axis.

The outboard boom 15 is obtained by integrally connecting a straight main frame 21 to a reinforcing member 22 that reinforces the main frame 21. The upper end portions of the two inclined frames 13 and 14 are connected to the upper end portion of the main frame 21 with the pair of pin joint portions 19a and 19b having horizontal axes.

In this case, when the upper inclined frame 13 is moved upward relative to the lower inclined frame 14, the pin joint portions 17a, 18a, and 19a move upward. Consequently, the opening angle between the inboard boom 12 and the outboard boom 15 decreases, and the lower end portion of the outboard boom 15 moves toward the base riser 11. When the upper inclined frame 13 is moved in a direction opposite to the above direction, the opening angle increases. Consequently, the lower end portion of the outboard boom 15 moves in a direction away from the base riser 11.

Figure 4:
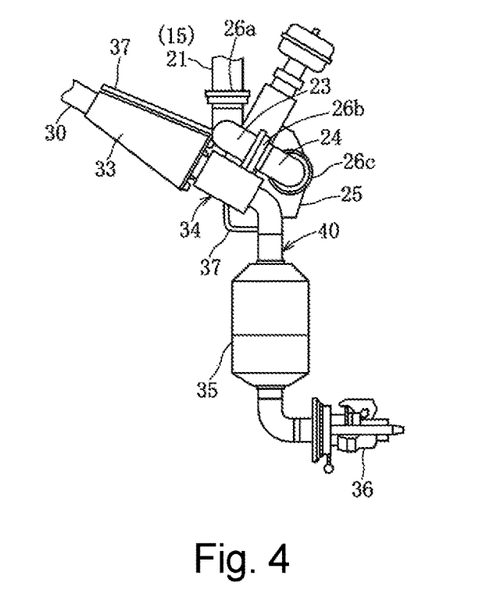
FIG. 4 is a side view of a vacuum insulation double connecting tube and the like connected to the distal end of a vacuum insulation double tube.

As shown in FIG. 4, the outboard boom 15 includes a first bent member 23 provided on the distal end side of the outboard boom 15, a second bent member 24, and a connecting member 25 connected with the distal end portion of the vacuum insulation double tube 30. The upper end portion of the first bent member 23 is connected to the distal end of the main frame 21 of the outboard boom 15 through a first rotating connecting portion 26a that is rotatable around the vertical axis. The upper end portion of the second bent member 24 is connected to the lower end portion of the first bent member 23 through a second rotating connecting portion 26b that is rotatable around the inclined axis. The connecting member 25 is connected to the lower end of the second bent member 24 through a third rotating connection portion 26c that is rotatable around the horizontal axis.

Accordingly, even if the liquefied hydrogen transport ship 2 swings during the transportation of liquefied hydrogen, since displacement and rotation can be absorbed through the first to third rotating connecting portions 26a to 26c, the support frame structure 10 can be prevented from being damaged. Note that the first to third rotating connecting portions 26a, 26b, and 26c may be formed from rotatory joints.

The outboard boom 15 is provided with an extended member 15a extending downward from its distal end. A mount base 27 is erected on the ground, on which the extended member 15a is mounted when the loading arm 1 is in an inactive state (pause state).

The counterweight 16 is attached to the proximal end connecting member 17. The counterweight 16 applies rotational moment to the support frame structure 10 in the clockwise direction in FIG. 2 to almost balance with counterclockwise rotational moment acting on the support frame structure 10 due to the own weights of a portion, which is located above the midway connecting member 18 of the inboard boom 12 and the own weights of the outboard boom 15. While the support frame structure 10 is in a pause state with the extended member 15a being mounted on the mount base 27, the counterclockwise rotational moment is set to be slightly larger than the clockwise rotational moment.

In this case, as shown in FIG. 2, the support frame structure 10 is provided with a first fluid pressure cylinder 28 (for example, a hydraulic cylinder) capable of making the inboard boom 12 pivot and a second fluid pressure cylinder 29 (for example, a hydraulic cylinder) capable of changing the opening angle A between the inboard boom 12 and the outboard boom 15. FIG. 1 omits the illustration of the first and second fluid pressure cylinders 28 and 29.

The first fluid pressure cylinder 28 is disposed on the rear surface side of the base riser 11 in a posture slightly inclined from the vertical. The proximal end portion of the cylinder body is joined to a lower portion of the base riser 11 with a pin joint portion 28a so as to be pivotable about the horizontal axis. The distal end portion of a piston rod is joined to a lower end side portion of the lower inclined frame 14 of the inboard boom 12 with a pin joint portion 28b so as to be pivotable about the horizontal axis.

When the piston rod of the first fluid pressure cylinder 28 extends, the inboard boom 12 pivots counterclockwise in FIG. 2. When the piston rod retracts, the inboard boom 12 pivots clockwise.

The second fluid pressure cylinder 29 is disposed on a lower end side portion of the inboard boom 12 in an inclined posture between the two inclined frames 13 and 14. The proximal end portion of the cylinder body is joined to the lower inclined frame 14 with a pin joint portion 29a so as to be pivotable about the horizontal axis. The distal end portion of the piston rod is jointed to the upper inclined frame 13 with a pin joint portion 29b so as to be pivotable about the horizontal axis.

When the piston rod of the second fluid pressure cylinder 29 extends, the upper inclined frame 13 moves upward relative to the lower inclined frame 14. As a result, the opening angle A between the inboard boom 12 and the outboard boom 15 decreases. When the piston rod retracts, the upper inclined frame 13 moves downward relative to the lower inclined frame 14, and the opening angle A between the inboard boom 12 and the outboard boom 15 increases.

Figure 5:
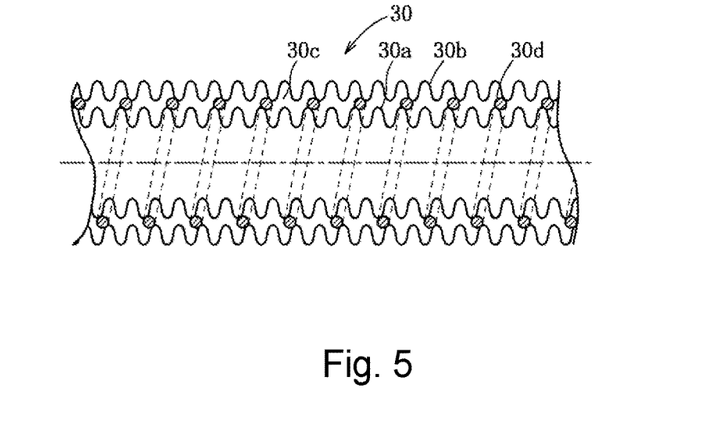
FIG. 5 is a sectional view of the vacuum insulation double tube.

As shown in FIG. 5, the flexible vacuum insulation double tube 30 includes an inner tube 30a formed from a metal (for example, SUS) flexible tube, an outer tube 30b formed from a metal (for example, SUS) flexible tube fitted on the inner tube 30a, and a vacuum layer 30c between the inner tube 30a and the outer tube 30b. The inner tube 30a has a diameter of, for example, 150 mmϕ, and the outer tube 30b has a diameter of, for example, 200 mmϕ. A spacer 30d in the form of a coil spring made of a synthetic resin (for example, fluorine resin) is interposed between the inner tube 30a and the outer tube 30b. Note that a super insulation material is wound on the outer circumferential surface of the inner tube 30a.

As shown in FIGS. 1 and 2, the proximal end portion of the vacuum insulation double tube 30 is connected to a liquefied hydrogen tubing 31 connected to a liquefied hydrogen storage tank, and a buffer member 32 is fitted on the vacuum insulation double tube 30 at its connecting portion.

As shown in FIGS. 1 and 2, the vacuum insulation double tube 30 is disposed in an upward curved shape (inverted U shape) in a space below the support frame structure 10. The distal end portion of the vacuum insulation double tube 30 is connected to the vacuum insulation double connecting tube 40. The vacuum insulation double connecting tube 40 is connected to the connecting member 25 of the distal end portion of the outboard boom 15.

A buffer member 33 is fitted on the vacuum insulation double tube 30 at the connecting portion between the vacuum insulation double tube 30 and the vacuum insulation double connecting tube 40.

As shown in FIG. 4, an opening/closing valve 34 is interposed in an upper portion of the vacuum insulation double connecting tube 40. An emergency release system 35 (ERS) is interposed in a midway portion of the vacuum insulation double connecting tube 40. A male-side joint 36 of a bayonet joint is connected to the lower end portion of the vacuum insulation double connecting tube 40.

As shown in FIG. 2, a small-diameter piggyback line 37 is disposed along the vacuum insulation double tube 30. The piggyback line 37 is a flexible tube made of SUS and having a vacuum insulation double tube structure, for example. The piggyback line 37 serves to replace the internal gas in that portion, which is closer to the distal end than the opening/closing valve 34, of the vacuum insulation double connecting tube 40 with nitrogen gas, hydrogen gas, or the like.

The proximal end portion of the piggyback line 37 is configured to be selectively connected to a nitrogen gas related tubing and a hydrogen gas related tubing through a plurality of switching valves. As shown in FIG. 4, the distal end portion of the piggyback line 37 is connected to that portion, which is located between the opening/closing valve 34 and the emergency release system 35, of the vacuum insulation double connecting tube 40.

The midway portion support mechanism 50 supports the lengthwise midway portion of the vacuum insulation double tube 30 on the support frame structure 10 through a hard curved member 51 curved upward in a convex shape.

The midway portion support mechanism 50 includes the curved member 51 made of a steel plate and curved in an arc shape, a tensile rope 52 (for example, a wire) connected to the curved member 51, a plurality of idling guide rings 53a and 53b that support the tensile rope 52 on the support frame structure 10, and a weight body 54 for weight balancing which is connected to the proximal end portion of the tensile rope 52.

The curved member 51 serves to protect the top portion of the vacuum insulation double tube 30, which is suspended by the tensile rope 52, so as to prevent the top portion from being bent. The curved member 51 is a member obtained by forming a steel band plate into a curved shape having a predetermined curvature radius. A member obtained by forming a steel member having a groove-like section (partially circular groove or inverted trapezoidal groove) into a curved shape may be used as the curved member 51. The vacuum insulation double tube 30 and the curved member 51 are supported by pulling the tensile rope 52 upward upon winding it around the curved member 51 and the vacuum insulation double tube 30 at the top portion of the curved member 51 supporting the vacuum insulation double tube 30. Note that a U-bolt fitted on the vacuum insulation double tube 30 may be connected to the curved member 51 and suspended by the tensile rope 52.

The idling guide ring 53a (sheave), which can rotate around a horizontal axis, is attached to a portion near the upper end of the lower included frame 14 of the inboard boom 12, and the idling guide ring 53b (sheave), which can rotate around a horizontal axis, is attached to a portion near the upper end of the base riser 11. The tensile rope 52 extending upward from the top portion of the curved member 51 extends downward along the inboard boom 12 through the idling guide ring 53a and further extends downward through the idling guide ring 53b. The weight body 54 for weight balancing is connected to the proximal end portion of the tensile rope 52. The weight body 54 for weight balancing is a weight body that balances with the weight acting from the vacuum insulation double tube 30 and the curved member 51 onto the tensile rope 52.

As the opening angle A between the inboard boom 12 and the outboard boom 15 increases, the weight body 54 for weight balancing moves upward to allow the top portion of the vacuum insulation double tube 30 to descend, whereas as the opening angle A decreases, the weight body 54 for weight balancing moves downward to allow the top portion of the vacuum insulation double tube 30 to ascend. This allows the vacuum insulation double tube 30 to be located at a proper position and have a proper shape in conjunction with the operation of the support frame structure 10.

Figure 3:
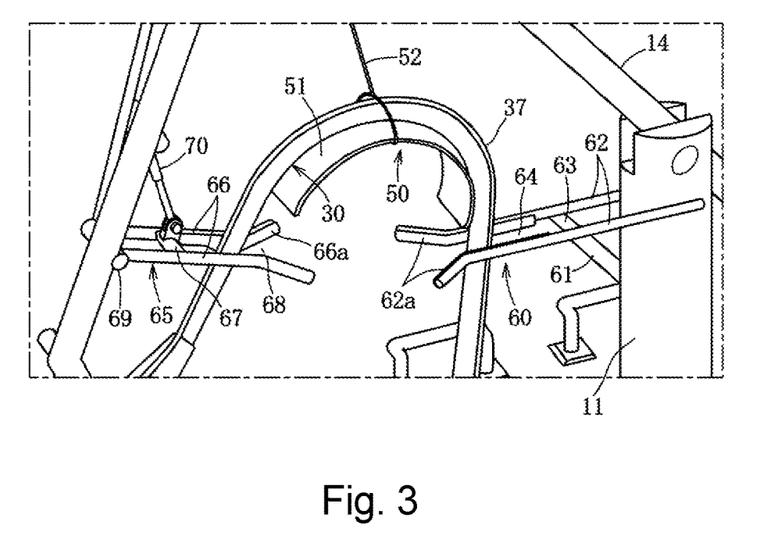
FIG. 3 is a main part perspective view showing the midway portion support mechanism, first and second members, and the like of the loading arm.

As shown in FIGS. 2 and 3, a first guide member 60, a second guide member 65, and a fluid pressure cylinder 70 are provided as follows. The first guide member 60 serves to guide the vacuum insulation double tube 30 so as to inhibit it from pivoting outside a vertical plane including the support frame structure 10. The first guide member 60 is attached to an upper portion of the base riser 11 in a horizontal posture so as to extend by a predetermined length toward the outboard boom 15, and is reinforced by an oblique reinforcing member 61.

Two rod members 62 of the first guide member 60, which have bent portions at their distal end sides, are arranged in a Y shape so as to face each other in the horizontal direction. Midway portions of the rod members 62 are connected to each other with a connecting member 63. An introduction guide portion 64 is formed between the rod members 62. Note that the introduction guide portion 64 is formed to increase in width toward the distal end side so as to increase the easiness of introduction when the vacuum insulation double tube 30 is introduced. Rubber cushion members 62a are attached to the inner surfaces, which face the introduction guide portion 64, of the two rod members 62. A midway portion of the middle portion of the vacuum insulation double tube 30 is always introduced into the introduction guide portion 64 and guided.

The second guide member 65 serves to guide the vacuum insulation double tube 30 so as to inhibit it from pivoting outside a vertical plane including the support frame structure 10. The second guide member 65 is hinged to the outboard boom 15 so as to make the proximal end portion pivotal about a horizontal axis within a vertical plane including the support frame structure 10. The second guide member 65 is provided with the fluid pressure cylinder 70 (for example, a hydraulic cylinder) that drives the second guide member 65 to make it pivot over a retract position where the second guide member 65 is tilted upward toward the outboard boom 15 and a guide position where the second guide member 65 protrudes horizontally toward the inboard boom 12.

Two rod members 66 of the second guide member 65, which have bent portions at their distal end sides, are arranged in a Y shape so as to face each other in the horizontal direction. Midway portions of the rod members 66 are connected to each other with a connecting member 67. An introduction guide portion 68 is formed between the rod members 66. Note that the introduction guide portion 68 is formed to increase in width toward the distal end side so as to increase the easiness of introduction when the vacuum insulation double tube 30 is introduced. Rubber cushion members 66a are attached to the inner surfaces, which face the introduction guide portion 68, of the two rod members 66.

The proximal end portion of each rod member 66 is connected to the main frame 21 of the outboard boom 15 with a hinge joint portion 69 that pivots about a horizontal axis. The proximal end portion of the cylinder main body of the fluid pressure cylinder 70 is hinged to a connecting piece fixed to the outboard boom 15 so as to be pivotal about a horizontal axis. The distal end portion of the piston rod of the fluid pressure cylinder 70 is hinged to a bracket protruding from the connecting member 67 so as to be pivotal about a horizontal axis.

The function and effect of the above loading arm 1 will be described below.

When the loading arm 1 is in the inactive state (pause state), the extended member 15a can be mounted on the mount base 27 and kept in the still state, as shown in FIG. 2.

The inboard boom 12 can be driven to pivot by the first fluid pressure cylinder 28, and the opening angle A between the inboard boom 12 and the outboard boom 15 can be changed by the second fluid pressure cylinder 29. This makes it possible to move the distal end portion of the outboard boom 15 to a desired position through the first and second fluid pressure cylinders 28 and 29.

When the liquefied hydrogen transport ship 2 is docked at the quay to unload liquefied hydrogen, the first and second fluid pressure cylinders 28 and 29 are operated to bring the distal end portion of the outboard boom 15 of the loading arm 1 close to a manifold 3 of the plumbing of the liquefied hydrogen transport ship 2, the male-side joint 36 of the bayonet joint of the distal end of the vacuum insulation double connecting tube 40 is connected to a female-side joint 3a of the bayonet joint of the manifold 3, and liquefied hydrogen is unloaded into the liquefied hydrogen storage tank on the land.

Since the flexible vacuum insulation double tube 30 for transporting liquefied hydrogen is used and supported by the support frame structure 10, tubings for transporting liquefied hydrogen can be omitted. This makes it unnecessary to provide any swivel joint.

Since the vacuum insulation double tube 30 is disposed in an upward curved shape in a space below the support frame structure 10, it is possible to achieve a reduction in facility cost by minimizing the length of the vacuum insulation double tube 30.

Since the vacuum insulation double connecting tube 40 connected to the distal end portion of the vacuum insulation double tube 30 is connected to the connecting member 25 at the distal end portion of the outboard boom 15, it is possible to cause the support frame structure 10 to support the distal end side portion of the vacuum insulation double tube 30 and move the vacuum insulation double connecting tube 40.

The midway portion support mechanism 50 is provided to support the lengthwise midway portion of the vacuum insulation double tube 30 on the support frame structure 10 through the curved member 51 curved upward. This allows the vacuum insulation double tube 30 to be curved in a shape conforming to the curved member 51 without bending a midway portion of the vacuum insulation double tube 30 and damage to the vacuum insulation double tube 30 can be prevented.

The midway portion support mechanism 50 includes the curved member 51, the tensile rope 52, the plurality of idling guide rings 53a and 53b, and the weight body 54 for weight balancing, and hence can implement the midway portion support mechanism 50 with a simple structure. The weight body 54 for weight balancing can support most of the weight of the vacuum insulation double tube 30 through the tensile rope 52 and the plurality of idling guide rings 53a and 53b.

Providing the first guide member 60 for the base riser 11 can guide the vacuum insulation double tube 30 so as to inhibit it from pivoting outside the vertical plane including the support frame structure 10. The second guide member 65 is connected to the outboard boom 15. The second guide member 65 can guide the vacuum insulation double tube 30 so as to inhibit it from pivoting outside the vertical plane including the support frame structure 10. In addition, since the fluid pressure cylinder 70 allows the second guide member 65 to be switched between the retract position and the guide position, the second guide member 65 can be switched to the guide position to guide the vacuum insulation double tube 30, as needed. When the second guide member 65 becomes an obstacle, it can be switched to the retract position.

An example of partially changing the above embodiment will be described next.

1) The support frame structure 10 is an example, and various types of support frame structures other than the support frame structure 10 can be used.

2) An interlocking mechanism may be provided, in place of the second fluid pressure cylinder 29, which causes the outboard boom 15 to incline in conjunction with the inclining operation of the inboard boom 12. In this case, when the inboard boom 12 inclines counterclockwise in FIG. 2, the outboard boom 15 inclines clockwise.

3) The support frame structure 10 may be configured to omit the first fluid pressure cylinder 28 and/or the second fluid pressure cylinder 29, manually tilt the inboard boom 12, or change the opening angle A between the inboard boom 12 and the outboard boom 15.

Figure 6:
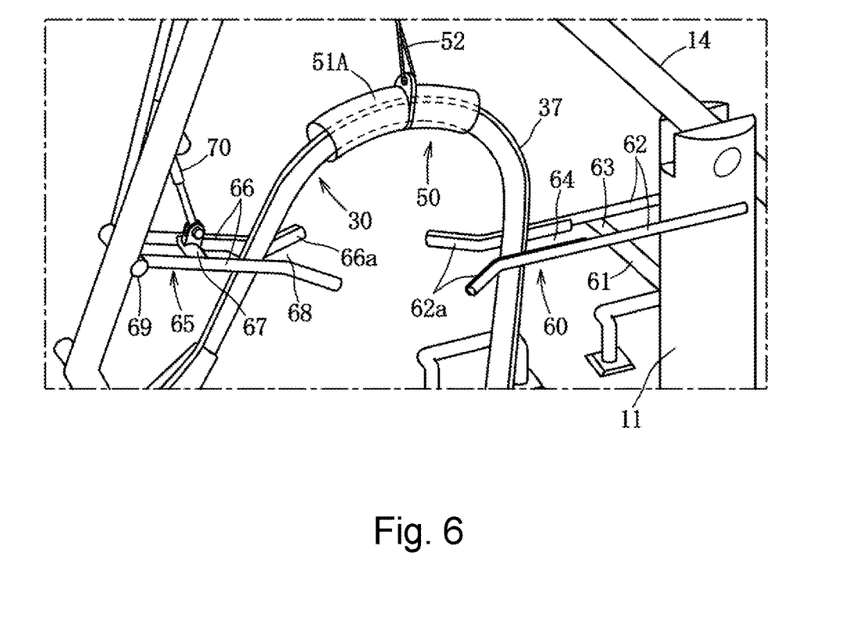
FIG. 6 is a view corresponding to FIG. 3 concerning a modification.

4) As shown in FIG. 6, in place of the curved member 51, a hard curved cylindrical body 51A with high rigidity serving as a curved member may be loosely fitted on the vacuum insulation double tube 30, and the curved cylindrical body 51A may be suspended by the tensile rope 52. Alternatively, a plurality of tensile ropes may be connected to a plurality of portions of the vacuum insulation double tube 30 to suspend the vacuum insulation double tube.

5) The proximal end portion of the first guide member 60 may be hinged to the base riser 11 so as to be configured to be switched between the retract position and the guide position like the second guide member.

REFERENCE SIGNS LIST 1 liquefied hydrogen loading arm
10 support frame structure
11 base riser
12 inboard boom
15 outboard boom
15a extended member
16 counterweight
27 mount base
28 first fluid pressure cylinder
29 second fluid pressure cylinder 30 vacuum insulation double tube
30a inner tube
30b outer tube
30c vacuum layer
50 midway portion support mechanism
51 curved member
51A curved cylindrical body
52 tensile rope
53a. 53b idling guide ring
54 weight body for weight balancing
60 first guide member
65 second guide member
70 fluid pressure cylinder

The invention claimed is:

1. A liquefied hydrogen loading arm configured to transport liquefied hydrogen, the loading arm comprising:
a support frame structure including a base riser erected on a ground, an inboard boom having a lengthwise midway portion connected to an upper end portion of the base riser so as to be pivotal about a horizontal axis, an outboard boom pivotally connected to a distal end portion of the inboard boom, and a counterweight attached to a proximal end portion of the inboard boom;
a flexible vacuum insulation double tube including a flexible metal inner tube, a flexible metal outer tube fitted on the inner tube, and a vacuum layer between the inner tube and the outer tube, the vacuum insulation double tube being disposed in an upward curved shape in a space below the support frame structure;
a vacuum insulation double connecting tube connected to a distal end portion of the vacuum insulation double tube and connected to a distal end portion of the outboard boom; and
a midway portion support mechanism configured to support a lengthwise midway portion of the vacuum insulation double tube on the support frame structure through a hard curved member curved upward in a convex shape.

2. The liquefied hydrogen loading arm according to claim 1, wherein the midway portion support mechanism comprises the curved member, a tensile rope connected to the curved member, a plurality of idling guide rings configured to support the tensile rope on the support frame structure, and a weight body for weight balancing connected to a proximal end portion of the tensile rope.

3. The liquefied hydrogen loading arm according to claim 2, further comprising a second guide member connected to the outboard boom so as to make a proximal end portion pivotal about a horizontal axis within a vertical plane including the support frame structure and configured to guide the vacuum insulation double tube so as to inhibit the vacuum insulation double tube from pivoting outside the vertical plane, and a fluid pressure cylinder configured to drive the second guide member so as to pivot over a retract position and a guide position.

4. The liquefied hydrogen loading arm according to claim 3, further comprising a first fluid pressure cylinder configured to drive the inboard boom so as to pivot and a second fluid pressure cylinder configured to change an opening angle between the inboard boom and the outboard boom.

5. The liquefied hydrogen loading arm according to claim 2, further comprising an extended member provided for the outboard boom so as to extend downward from a distal end of the outboard boom, and a mount base erected on a ground on which the extended member is mounted when the liquefied hydrogen loading arm is in an inactive state.

6. The liquefied hydrogen loading arm according to claim 5, further comprising a first fluid pressure cylinder configured to drive the inboard boom so as to pivot and a second fluid pressure cylinder configured to change an opening angle between the inboard boom and the outboard boom.

7. The liquefied hydrogen loading arm according to claim 2, further comprising a first fluid pressure cylinder configured to drive the inboard boom so as to pivot and a second fluid pressure cylinder configured to change an opening angle between the inboard boom and the outboard boom.

8. The liquefied hydrogen loading arm according to claim 1, further comprising a first guide member provided for the base riser and configured to guide the vacuum insulation double tube so as to inhibit the vacuum insulation double tube from pivoting outside a vertical plane including the support frame structure.

9. The liquefied hydrogen loading arm according to claim 8, further comprising a first fluid pressure cylinder configured to drive the inboard boom so as to pivot and a second fluid pressure cylinder configured to change an opening angle between the inboard boom and the outboard boom.

10. The liquefied hydrogen loading arm according to claim 1, further comprising a second guide member connected to the outboard boom so as to make a proximal end portion pivotal about a horizontal axis within a vertical plane including the support frame structure and configured to guide the vacuum insulation double tube so as to inhibit the vacuum insulation double tube from pivoting outside the vertical plane, and a fluid pressure cylinder configured to drive the second guide member so as to pivot over a retract position and a guide position.

11. The liquefied hydrogen loading arm according to claim 10, further comprising a first fluid pressure cylinder configured to drive the inboard boom so as to pivot and a second fluid pressure cylinder configured to change an opening angle between the inboard boom and the outboard boom.

12. The liquefied hydrogen loading arm according to claim 1, further comprising an extended member provided for the outboard boom so as to extend downward from a distal end of the outboard boom, and a mount base erected on a ground on which the extended member is mounted when the liquefied hydrogen loading arm is in an inactive state.

13. The liquefied hydrogen loading arm according to claim 12, further comprising a first fluid pressure cylinder configured to drive the inboard boom so as to pivot and a second fluid pressure cylinder configured to change an opening angle between the inboard boom and the outboard boom.

14. The liquefied hydrogen loading arm according to claim 1, further comprising a first fluid pressure cylinder configured to drive the inboard boom so as to pivot and a second fluid pressure cylinder configured to change an opening angle between the inboard boom and the outboard boom.

15. The liquefied hydrogen loading arm according to claim 2, further comprising a first guide member provided for the base riser and configured to guide the vacuum insulation double tube so as to inhibit the vacuum insulation double tube from pivoting outside a vertical plane including the support frame structure.

16. The liquefied hydrogen loading arm according to claim 15, further comprising a first fluid pressure cylinder configured to drive the inboard boom so as to pivot and a second fluid pressure cylinder configured to change an opening angle between the inboard boom and the outboard boom.

\* \* \* \* \*